(12) United States Patent
Neta

(10) Patent No.: US 8,761,593 B2
(45) Date of Patent: Jun. 24, 2014

(54) COMMON FOCUS ENERGY EMITTER

(76) Inventor: Uri Neta, Koranit (IL)

(*) Notice: Subject to any disclaimer, the term of this patent is extended or adjusted under 35 U.S.C. 154(b) by 0 days.

(21) Appl. No.: 13/884,924

(22) PCT Filed: Nov. 10, 2011

(86) PCT No.: PCT/IL2011/000869
§ 371 (c)(1),
(2), (4) Date: May 10, 2013

(87) PCT Pub. No.: WO2012/063240
PCT Pub. Date: May 18, 2012

(65) Prior Publication Data
US 2013/0230306 A1    Sep. 5, 2013

(30) Foreign Application Priority Data

Nov. 10, 2010   (IL) .......................................... 209227

(51) Int. Cl.
*G03B 15/03*    (2006.01)
*F21V 21/08*    (2006.01)
*F21V 14/04*    (2006.01)
*F21V 7/08*     (2006.01)

(52) U.S. Cl.
CPC . *G03B 15/03* (2013.01); *F21V 7/08* (2013.01); *F21V 14/04* (2013.01)
USPC ............................ 396/109; 362/232; 362/241

(58) Field of Classification Search
CPC .......... G03B 15/02; G03B 15/03; F21V 7/08; F21V 7/09; F21V 14/04
USPC ............................ 396/109, 200; 362/232, 241
See application file for complete search history.

(56) References Cited

U.S. PATENT DOCUMENTS

| 4,089,047 | A  | 5/1978  | Luderitz       |
| 4,754,381 | A  | 6/1988  | Downs          |
| 7,455,438 | B2 | 11/2008 | Repetto et al. |
| 7,482,636 | B2 | 1/2009  | Murayama et al.|
| 7,665,872 | B2 | 2/2010  | Nakabayashi    |
| 7,824,088 | B2 | 11/2010 | Iwasaki        |
| 7,905,634 | B2 | 3/2011  | Agurok et al.  |
| 7,906,722 | B2 | 3/2011  | Fork et al.    |

(Continued)

FOREIGN PATENT DOCUMENTS

| WO | 00/60396 A1   | 10/2000 |
| WO | 2009/058034 A1 | 5/2009 |

OTHER PUBLICATIONS

European Search Report dated Jan. 27, 2014 for EP Application No. 11839678.7 (PCT/IL2011/000869).

*Primary Examiner* — W B Perkey
(74) *Attorney, Agent, or Firm* — Novick, Kim & Lee, PLLC; Harold L. Novick

(57) ABSTRACT

The invention is directed towards common focus energy emitters having a common focus energy source and including two or more energy source units each having a 3D concave primary reflector for reflecting energy into an energy beam focused at the common focus energy source, and a secondary optical element for shaping the energy beam into an exit beam component of the exit beam. The 3D concave primary reflectors bound a minor 3D concave section of an imaginary primary reflector ellipsoid of revolution having a primary reflector axis of revolution non-coaxial with the energy emitter axis. Each primary reflector axis of revolution includes a first focal point disposed at the common focus energy source and a second focal point where its associated energy source is disposed thereat.

18 Claims, 18 Drawing Sheets

(56) References Cited

U.S. PATENT DOCUMENTS

| | | | |
|---|---|---|---|
| 8,083,379 B2 * | 12/2011 | Schulz et al. | 362/300 |
| 2006/0203497 A1 | 9/2006 | Shimaoka et al. | |
| 2007/0268704 A1 | 11/2007 | Kakuta | |
| 2009/0323338 A1 | 12/2009 | Agurok et al. | |
| 2013/0230306 A1 * | 9/2013 | Neta | 396/200 |

* cited by examiner

COMMON FOCUS ENERGY EMITTER

FIELD OF THE INVENTION

The invention pertains to common focus energy emitters for emitting an exit beam toward an object.

BACKGROUND OF THE INVENTION

Common focus energy emitters are known in the art.

U.S. Pat. No. 4,089,047 to Luderitz illustrates and describes three dimensional concave compound reflectors for focusing light from two or more light sources into an exit light beam.

U.S. Pat. No. 4,754,381 to Downs illustrates and describes three dimensional ellipsoidal concave reflector systems for the concentration of light, ultrasonic or shock waves, and the like, into an exit beam.

The aforesaid reflectors have a partial elliptical shape in an imaginary plane including an exit beam axis defined between a common focus energy source and an exit beam aperture. The aforesaid reflectors bound an imaginary body of revolution formed by revolution of the partial elliptical shape about the energy emitter axis. However, since nearly all the rays emitted by the energy sources are not on the imaginary plane, so correspondingly the aforesaid reflectors focus only a very small proportion of the total available energy emitted by the energy sources in the direction of their exit beam axes.

SUMMARY OF THE INVENTION

The present invention is directed towards common focus energy emitters having a common focus energy source for emitting an exit beam through an exit beam aperture toward an object. The common focus energy source and the exit beam aperture define an energy emitter axis. The energy emitters include at least two spaced apart energy source units, each energy source unit having an energy source for emitting energy, a three dimensional concave primary reflector for reflecting the energy emitted by its associated energy source into an energy beam focused at the common focus energy source, and a secondary optical element for shaping the energy beam from its associated primary reflector traversing the common focus energy source into an exit beam component of the exit beam.

The three dimensional concave primary reflectors of the present invention differ from the hitherto described three dimensional concave reflectors insofar as the former bound a minor three dimensional concave section of an imaginary primary reflector ellipsoid of revolution having a primary reflector axis of revolution non-coaxial with the energy emitter axis. Each primary reflector axis of revolution includes a pair of spaced apart focal points one of which is disposed at the common focus energy source and its associated energy source is disposed at the other focal point. By virtue of this geometrical arrangement, the primary reflectors of the present invention focus a high proportion of the energy originating at their energy sources at the common focus energy source.

The primary reflector axes of revolution each subtend a primary reflector tilt angle relative to the energy emitter axis in an imaginary plane including the energy emitter axis. The primary reflectors can have the same or different primary reflector tilt angles. Changing primary reflector tilt angles modifies exit beam components in terms of their energy intensity. The energy emitter can include a primary reflector tilting mechanism for selectively tilting one or more primary reflectors to modify their primary reflector tilt angles. Primary reflectors can be selectively tilted equally or differently.

The imaginary primary reflector ellipsoid of revolution is preferably a simple ellipsoid fitting the geometric formula $$\frac{x^2}{a^2} + \frac{y^2}{b^2} = R^2,$$

where the two spaced apart focal points are given by $f=\sqrt{a^2-b^2}$ with its semi-major axis denoted a and its semi-minor axis denoted b. The imaginary primary reflector ellipsoid of revolution can equally be a complex ellipsoid fitting the geometric formula $$\Sigma_i\left(\frac{x}{a_i}\right)^{2i} + \Sigma_i\left(\frac{y}{b_i}\right)^{2i} = R^2.$$

The secondary optical elements can be implemented as individual three dimensional concave secondary reflectors for shaping the energy beams originating at their respective energy source units into a suitable shaped exit beam component depending on the application at hand. The three dimensional concave secondary reflectors each bound a minor three dimensional concave section of an imaginary secondary reflector body of revolution having a secondary reflector axis of revolution including a focal point located at the common focus energy source and subtending a secondary reflector tilt angle relative to the energy emitter axis in the imaginary plane including the energy emitter axis. The secondary reflectors can have the same or different secondary reflector tilt angles. Changing the secondary reflector tilt angles modifies the exit beam components in terms of their energy intensity and their exit angle relative to the energy emitter axis. The energy emitter can include a secondary reflector tilting mechanism for selectively tilting one or more individual secondary reflectors to modify their secondary reflector tilt angles relative to the energy emitter axis. Individual secondary reflectors can be selectively tilted equally or differently.

Alternatively, common focus energy emitters can include a single continuous three dimensional concave secondary reflector instead of the individual secondary reflectors for shaping the energy beams from their respective energy source units. The energy emitter can include a secondary reflector tilting mechanism for selectively tilting the single continuous three dimensional concave secondary reflector to modify its secondary reflector tilt angle relative to the energy emitter axis. Single continuous three dimensional concave secondary reflectors can be either paraboloid or an ellipsoid end. Paraboloid secondary reflectors can be either simple paraboloid fitting the geometric formula $y=ax^2$ or complex paraboloid fitting the geometric formula $y=\Sigma_i \alpha_{ix}^{2i}$. Ellipsoid secondary reflectors can be either simple ellipsoid or complex ellipsoid fitting the aforementioned geometric formulae.

Alternatively, the secondary optical elements can be implemented as individual optical lens segments for shaping the energy beams originating at their respective energy source units into suitably shaped exit beam components of the exit beam depending on the application at hand. Energy emitters can include a single continuous optical lens instead of individual optical lens segments for shaping the energy from their respective energy source units. The single continuous optical lens has an optical lens axis of revolution coaxial with the energy emitter axis.

Common focus energy emitters of the present invention can employ energy source units radiating different types of energy including inter alia electromagnetic radiation, sound energy, and the like. Energy emitters can employ even or odd numbers of energy source units. The energy source units are preferably equispaced around the energy emitter axis but are not necessarily equispaced. Energy emitters can employ EMR sources radiating EMR at different EMR spectrum frequencies including inter alia visible light, infra red light, UV, radio waves, and the like. Energy emitters can employ EMR sources radiating at different EMR frequencies in the visible light spectrum for affording a multi-color illumination beam. Energy source units can be individually operated. Alternatively, energy source units can be clustered into groups of two or more energy source units for simultaneous operation for combining their energy.

Common focus energy emitters of the present invention can be suitably packaged for a wide range of illumination applications, imaging applications, medical applications, and the like. Exemplary illumination applications include inter alia car headlamps, video projectors, very fast scanner light sources, projectors, multispectral illumination, and the like. Exemplary imaging applications include inter alia multispectral imaging, and the like. Exemplary medical applications include inter alia skin treatments, hair removal, pain relief, and the like.

Common focus energy emitters of the present invention can be packaged as discrete replaceable components for use in more complex devices and systems. Energy emitters of the present invention can be packaged as discrete energy emitting devices including a controller for controlling the energy emitter. Controllers can be pre-programmed or user programmable. Such energy emitting devices can include one or more sensors for sensing ambient conditions for controlling their operation. Exemplary ambient conditions to be sensed include inter alia heat, light, pressure, and the like.

Other common focus energy emitting devices of the present invention can include an energy emitting stack of two or more energy emitters each emitting an exit beam along the energy emitter axis. The energy emitters can emit exit beams of the same energy type or different energy type. Energy emitters of the present invention can be included image acquisition systems for imaging remote objects.

BRIEF DESCRIPTION OF THE DRAWINGS

In order to understand the invention and to see how it can be carried out in practice, preferred embodiments will now be described, by way of non-limiting examples only, with reference to the accompanying drawings in which similar parts are likewise numbered, and in which.

DETAILED DESCRIPTION OF PREFERRED EMBODIMENTS OF THE PRESENT INVENTION

Figure 1:
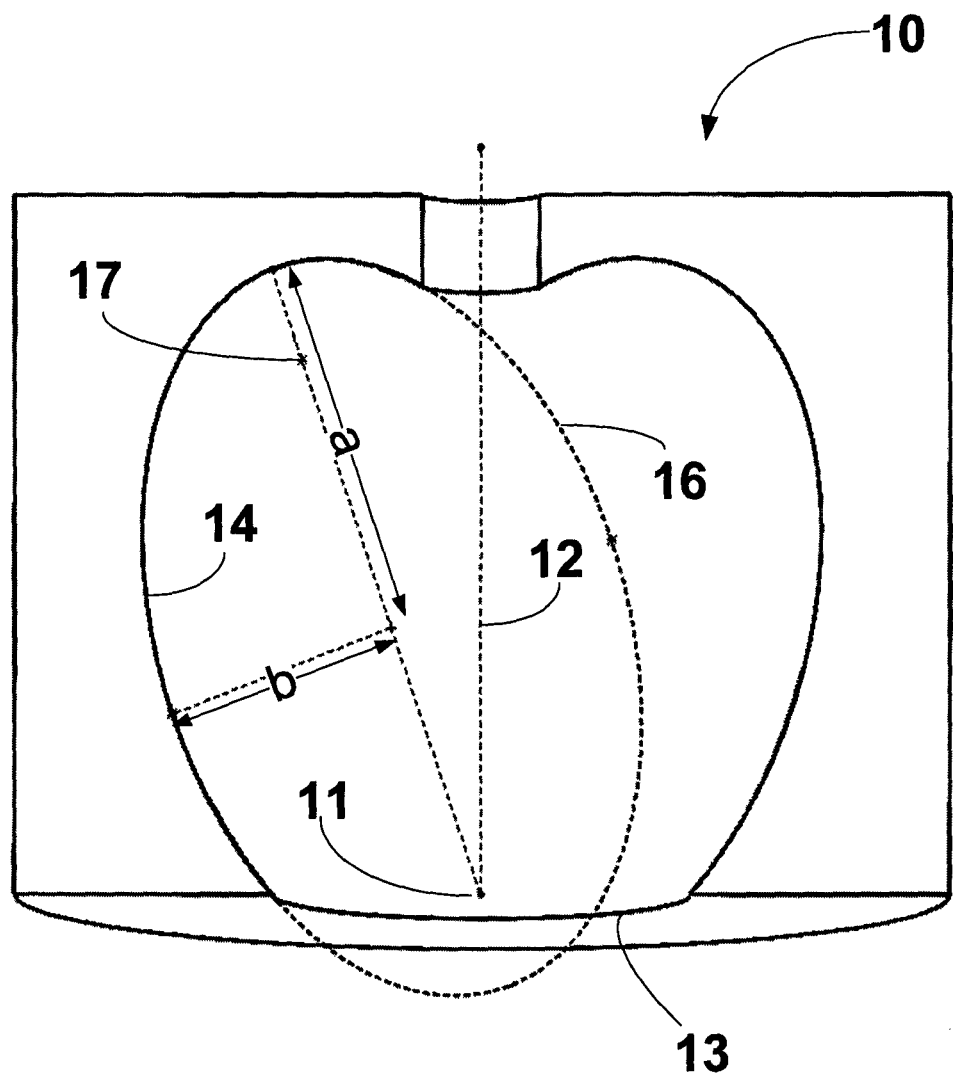
FIG. 1 is an isometric view of a prior art three dimension concave reflector having a common focal point and an exit beam axis and an imaginary plane including the exit beam axis.
Figure 2:
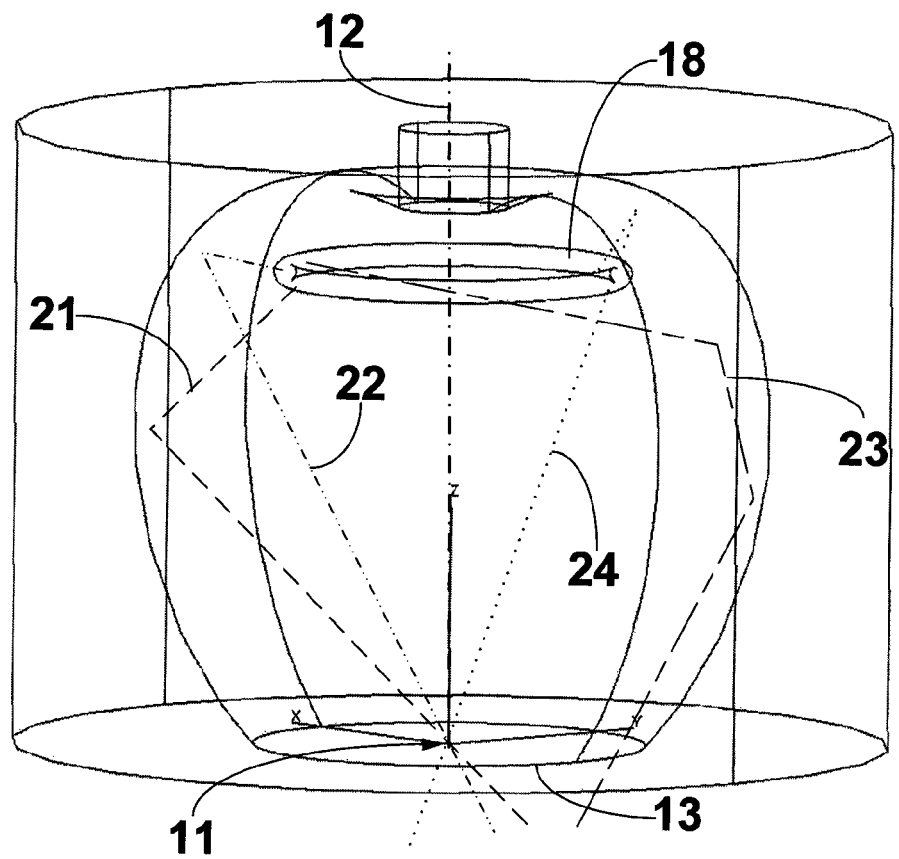
FIG. 2 is a three dimensional ray diagram showing rays lying on the imaginary plane passing through the common focal point.
Figure 3:
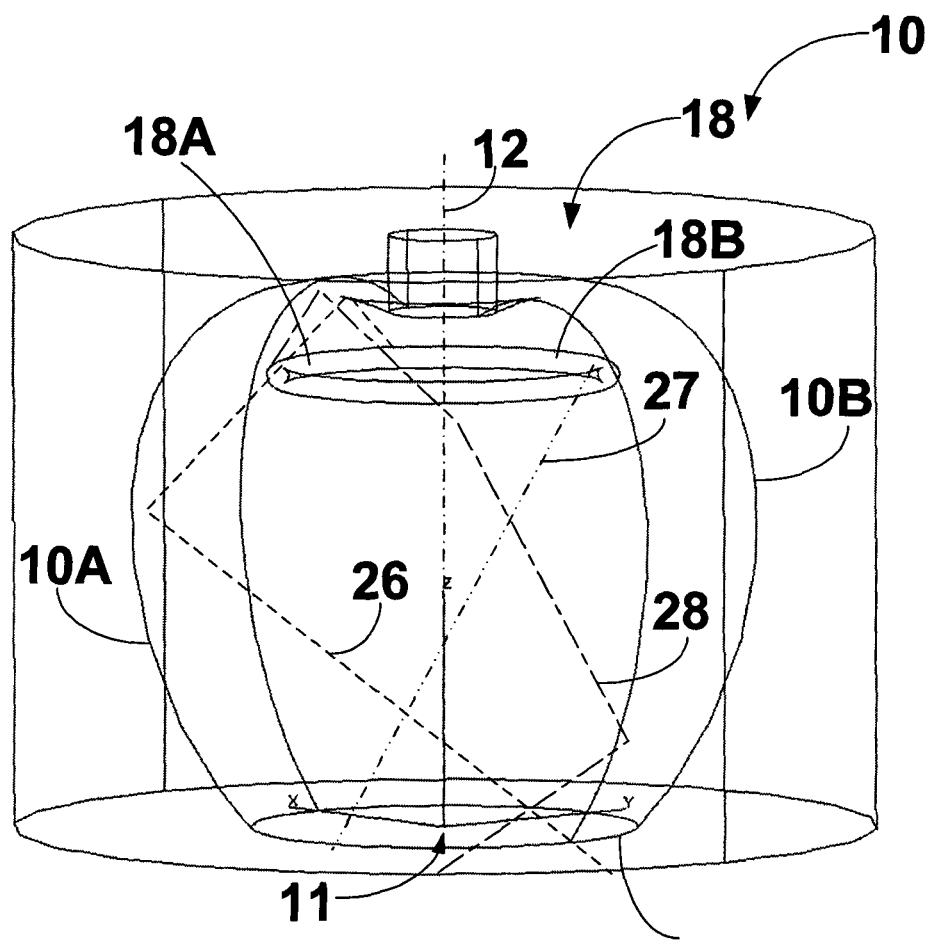
FIG. 3 is a three dimensional ray diagram showing rays not lying on the imaginary plane not passing through the common focal point.

FIGS. 1 to 3 show a prior art three dimensional concave reflector 10 having a common focal point 11, a reflector axis 12 and an exit beam aperture 13 as illustrated and described in aforementioned U.S. Pat. No. 4,089,047 to Luderitz and U.S. Pat. No. 4,754,381 to Downs. The concave reflector 10 is constructed by revolution of a partial elliptical shape 14 of an imaginary ellipse 16 about the reflector axis 12. The imaginary ellipse 16 has a second focal point 17, a semi-major axis a and a semi-minor axis b in an imaginary plane including the reflector axis 12. The vast majority of rays radiating from a light source deployed in the concave reflector 10 do not lie on an imaginary plane including the reflector axis 12 such that the concave reflector 10 can focus only a very small proportion of the total available energy emitted by the light source along the exit beam axis.

FIGS. 2 and 3 show the concave reflector 10 having a ring light source 18 for outwardly radiating light rays. The concave reflector 10 can be considered to have a left reflector 10A on the left of the reflector axis 12 and a right reflector 10B on the right of the reflector axis 12. The ring light source 18 can be considered to have a left side 18A on the left of the reflector axis 12 and a right side 18B on the right of the reflector axis 12. FIG. 2 shows three light rays 21, 22 and 23 radiating from the left side 18A on an imaginary plane including the reflector axis 12. The light rays 21 and 22 are directed towards the left reflector 10A and therefore pass through the common focal point 11. The light ray 23 is directed towards the right reflector 10B and does not pass through the common focal point 11. FIG. 2 also shows a fourth light ray 24 radiating from the right side 18A on the imaginary plane including the reflector axis 12 and directed towards the right reflector 10B and therefore passing through the common focal point 11. FIG. 3 shows three rays 26, 27 and 28 which do not lie on the imaginary plane including the reflector axis 12 and therefore do not pass through the common focal point 11.

Figure 4:
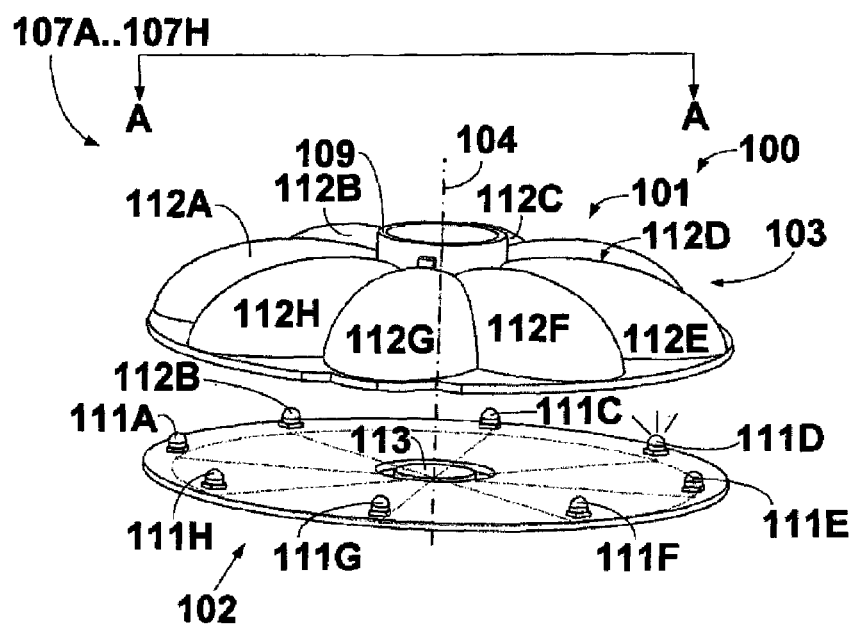
FIG. 4 is an exploded isometric view of a preferred embodiment of a common focus energy emitter including eight energy source units having a single continuous paraboloid secondary reflector and a common focus energy source for emitting an exit beam towards an object.
Figure 5:
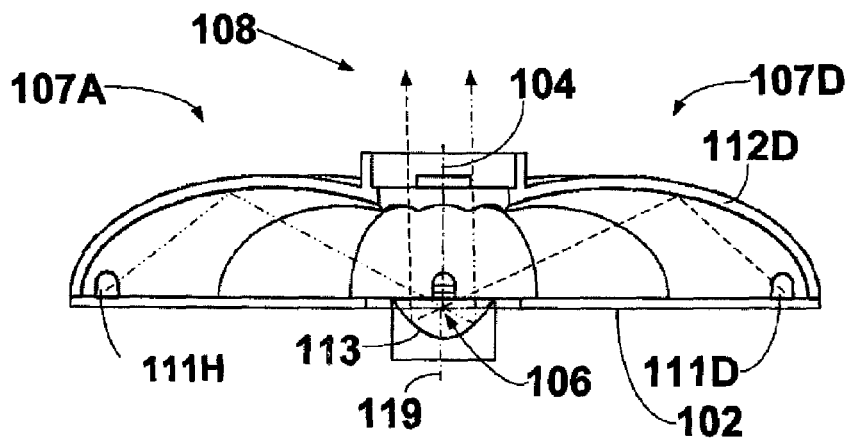
FIG. 5 is a cross section of FIG. 4's energy emitter in an imaginary plane including its energy emitter axis along line A-A in FIG. 4.
Figure 6:
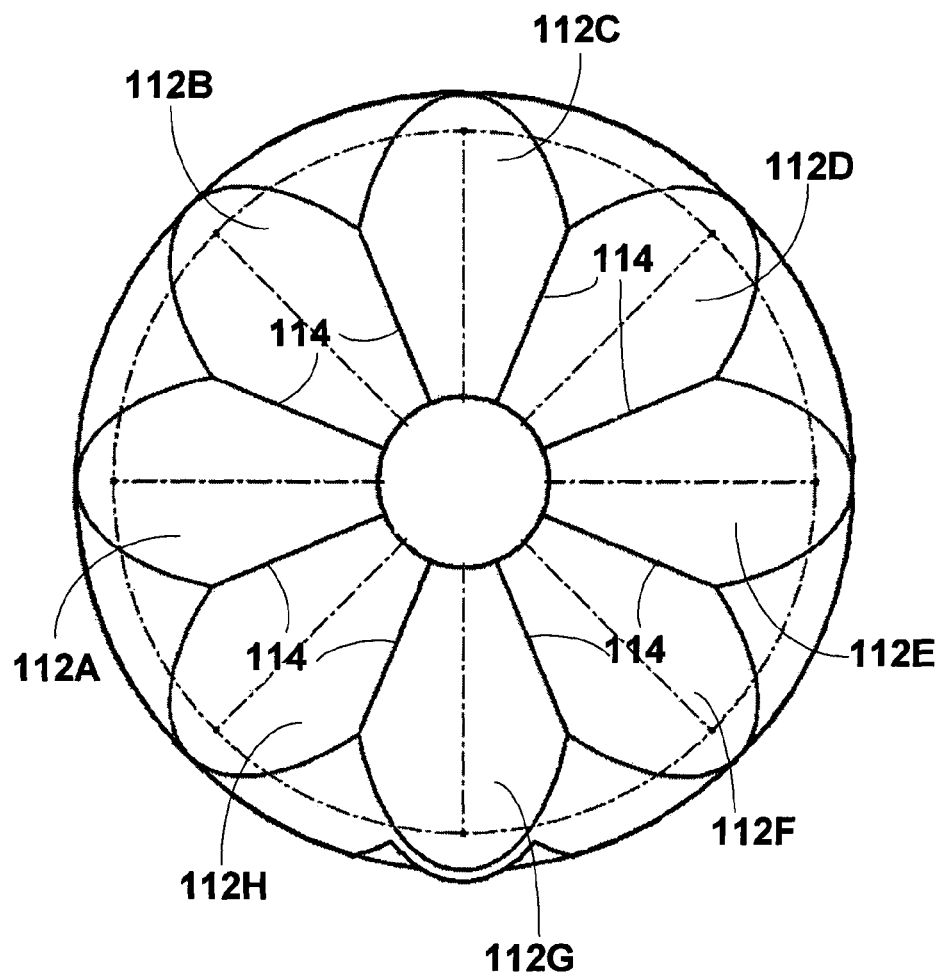
FIG. 6 is a bottom plan view of a cover plate of FIG. 4's energy emitter.

FIGS. 4 to 6 show a common focus energy emitter 100 including a housing 101 having a base plate 102 and a cover plate 103 for mounting on the base plate 102. The energy emitter 100 has an energy emitter axis 104 including a common focus energy source 106 located in the housing 101. The energy emitter 100 includes eight energy source units 107A, . . . , 107H for emitting an exit beam 108 through an exit beam aperture 109 formed in the cover plate 103. The eight energy source units 107A, . . . , 107H are preferably equispaced about the energy emitter axis 104 for facilitating heat dissipation.

Each energy source unit 107 includes an energy source 111 for emitting energy, a three dimensional concave primary reflector 112 and a segment of a single continuous paraboloid secondary reflector 113 for shaping the energy beam from its respective energy source 111. The base plate 102 supports the eight energy sources 111A, . . . , 111H and the single continuous paraboloid secondary reflector 113. The cover plate 103 is formed with the eight primary reflectors 112A, . . . , 122H appearing as eight cavities extending radial outward from the energy emitter axis 104 and having juncture lines 114 between adjacent pairs of primary reflectors 112.

Figure 7:
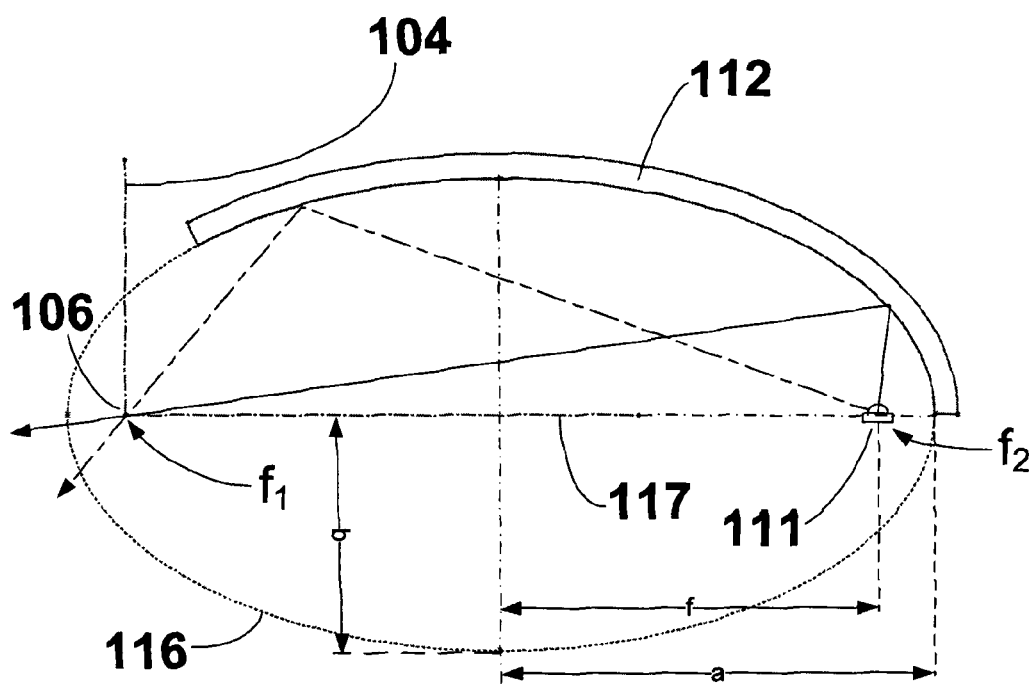
FIG. 7 is a schematic diagram showing construction of a primary reflector relative to the energy emitter axis.

FIG. 7 shows an ellipse 116 having a primary reflector axis of revolution 117 non-coaxial with the energy emitter axis 104 and subtending a right angle primary reflector tilt angle α with respect to the energy emitter axis 104. The three dimensional concave primary reflector 112 bounds a minor three dimensional concave section of an imaginary primary reflector ellipsoid of revolution on revolution of the ellipse 116. The imaginary primary reflector ellipsoid of revolution is a simple ellipsoid fitting the geometric formula $$\frac{x^2}{a^2} + \frac{y^2}{b^2} = R^2$$

having a pair of spaced apart focal points f1 and f2 along its primary reflector axis of revolution 117 given by $f=\sqrt{a^2-b^2}$.

The imaginary primary reflector ellipsoid of revolution has a semi-major axis a and a semi-minor axis b. One of its focal points f1 is co-located at the common focus energy source 106. Its associated energy source 111 is disposed at its other focal point f2.

Figure 8:
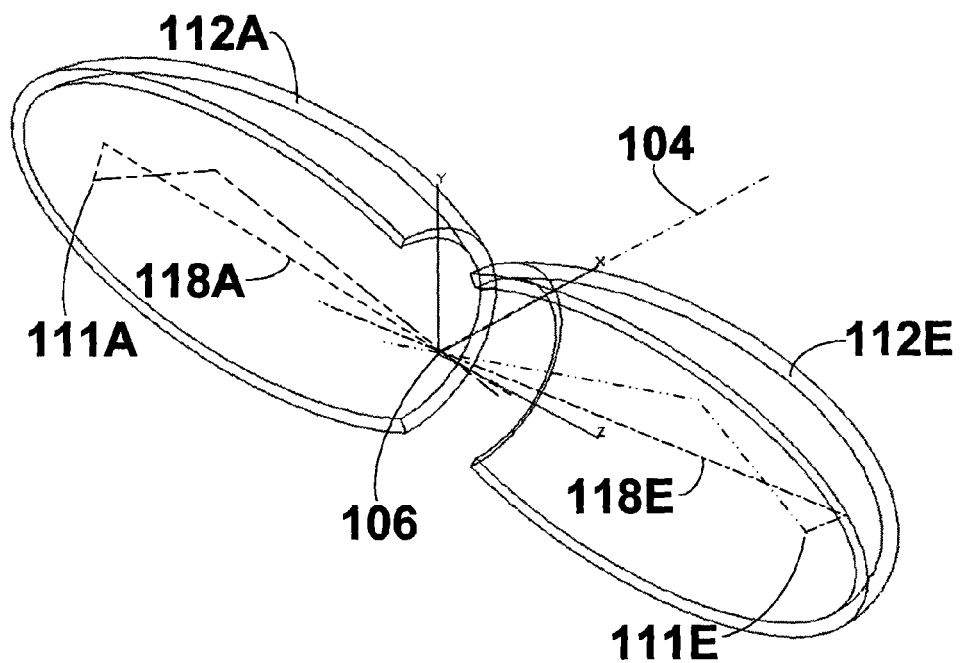
FIG. 8 is a three dimensional ray diagram showing a pair of opposite primary reflectors reflecting ray from their respective energy sources into energy beams focused at the common focus energy source.
Figure 9:
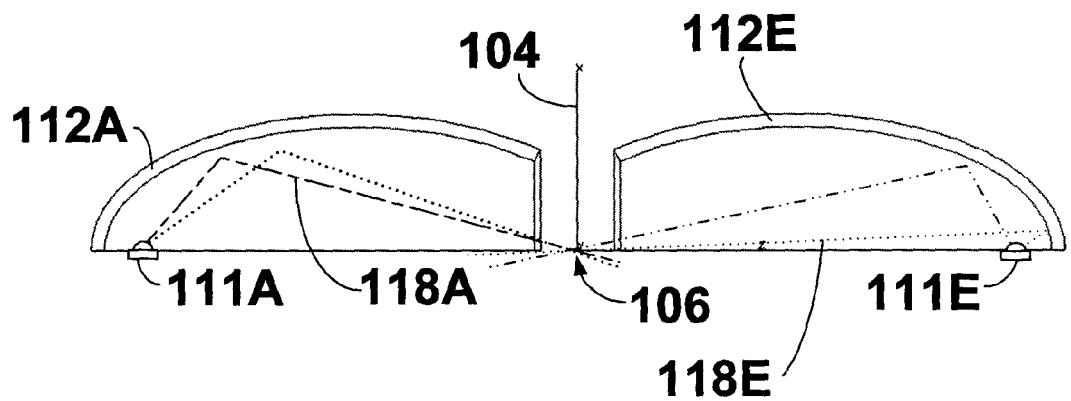
FIG. 9 is a two dimension ray diagram of FIG. 8 in the imaginary plane including the energy emitter axis.
Figure 10:
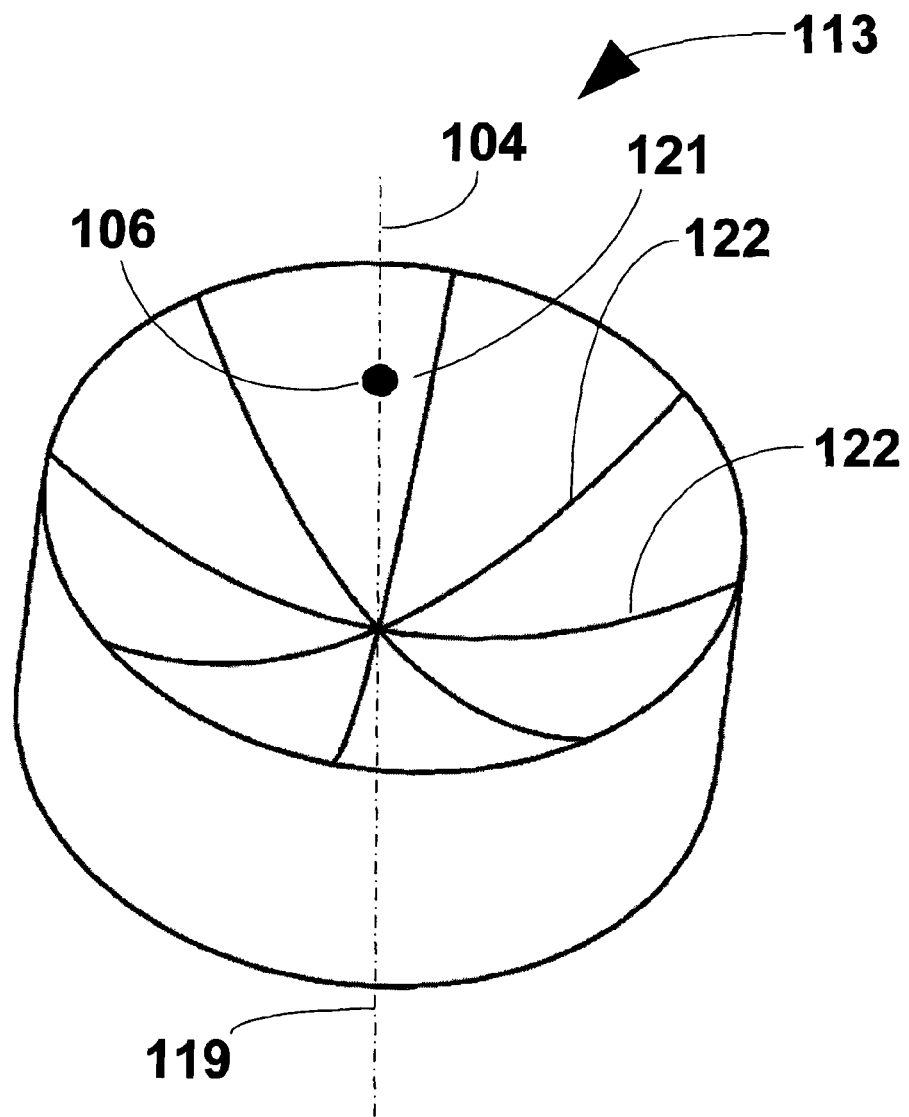
FIG. 10 is an isometric view of FIG. 4's single continuous paraboloid secondary reflector.

FIGS. 8 and 9 show two opposite primary reflector 112A and 112E reflecting rays emitted by their respective energy sources 111A and 111E into energy beams 118 focused at the common focus energy source 106. The primary reflectors 112 successfully reflect nearly each and every ray towards the common focus energy source 106 by virtue of their construction.

FIGS. 4 to 6 and 10 show the paraboloid secondary reflector 113 has a secondary reflector axis of revolution 119 coaxial with the energy emitter axis 104 and includes a focal point 121 located at the common focus energy source 106. The paraboloid secondary reflector 113 fits the simple paraboloid geometric formula $y=ax^2$. In operation, the paraboloid secondary reflector 113 has a dark line 122 (see FIG. 10) between adjacent areas illuminated by adjacent primary reflectors 112 corresponding to the juncture lines 114 therebetween.

The common focus energy emitter 100 can include different types of energy sources 111 for emitting different types of energy including inter alia electromagnetic radiation, sound energy, and the like. The common focus energy emitter 100 can employ EMR sources radiating EMR at different EMR spectrum frequencies including inter alia visible light, infra red light, UV, radio waves, and the like. The common focus energy emitter 100 can employ EMR sources radiating at different EMR frequencies in the visible light spectrum for affording a multi-color illumination beam. Suitable visible light sources include inter alia LEDs, lasers, and the like. The eight energy sources 111 can be individually operated. Alternatively, the energy sources 111 can be clustered into groups of two or more energy sources for simultaneous operation for combining their energy.

Figure 11:
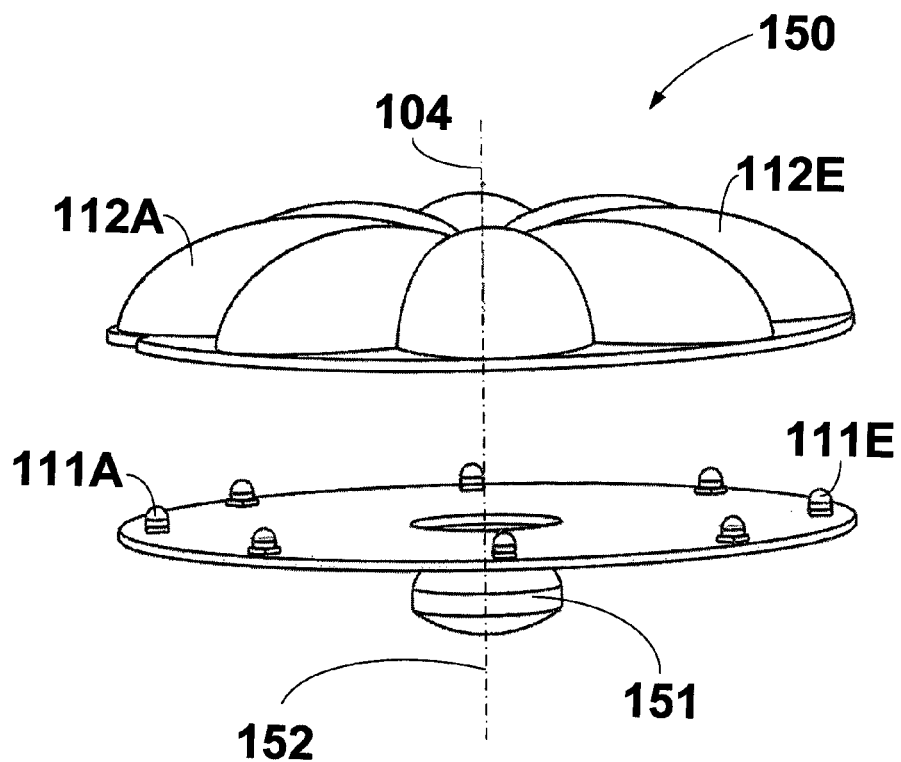
FIG. 11 is an exploded isometric view of another preferred embodiment of a common focus energy emitter having a single continuous optical lens for emitting an exit beam towards an object.
Figure 12:
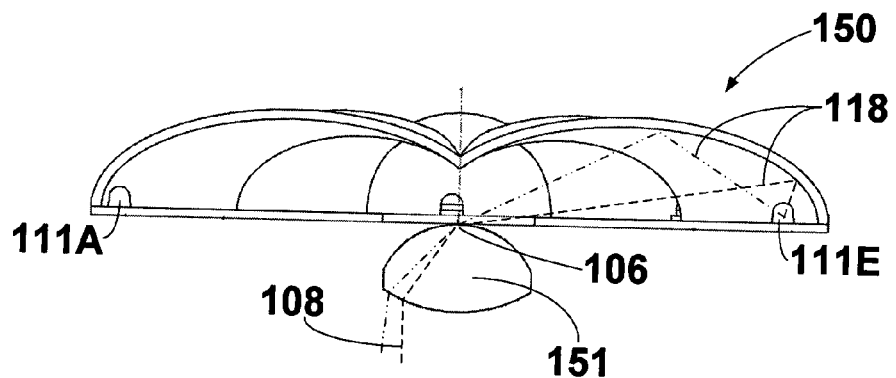
FIG. 12 is a cross section of FIG. 11's energy emitter in an imaginary plane including its energy emitter axis.

FIGS. 11 and 12 show an energy emitter 150 similar in construction and operation as the energy emitter 100 for emitting an exit beam 108. The former 150 differs from the latter 100 insofar the former 150 includes a single continuous optical lens 151 for shaping the energy beams 118 from the eight energy sources 111A, . . . , 111E and effectively acting an exit beam aperture for the exit beam 108. The single continuous optical lens 151 has an optical lens axis of revolution 152 coaxial with the energy emitter axis 104. The single continuous optical lens 151 is typically located adjacent the common focus energy source 106 to prevent loss of energy reflected by the primary reflectors 112.

Figure 13A:
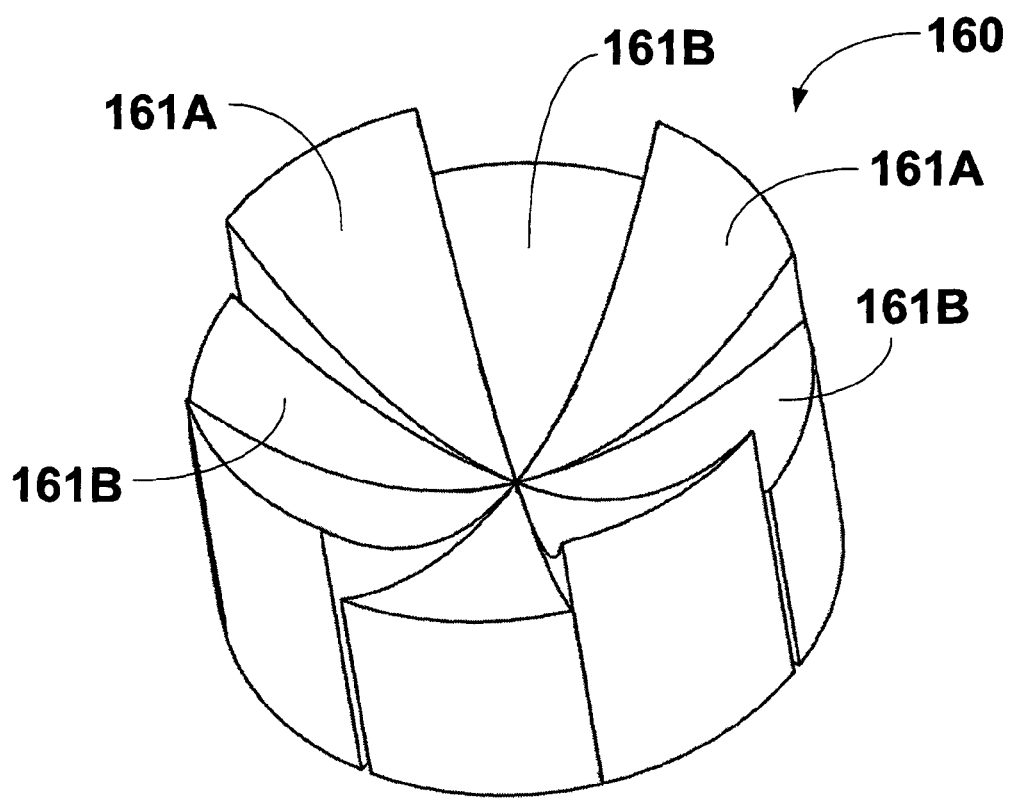
FIG. 13A is an isometric view showing a set of eight individual three dimensional concave secondary reflectors for use in FIG. 4's energy emitter including four Type I secondary reflectors and four Type II secondary reflectors.
Figure 13B:
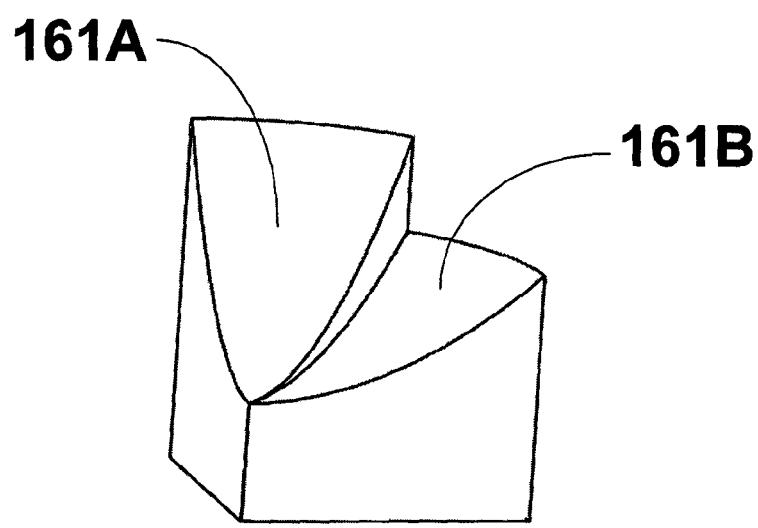
FIG. 13B is an isometric view showing the two different types of secondary reflector side by side.

FIG. 13A shows a set of eight individual three dimensional concave secondary reflectors 160 including four Type I secondary reflectors 161A and four Type II secondary reflectors 161B for replacing the single continuous paraboloid secondary reflector 113. The two different types of individual secondary reflectors 161A and 161B shown side by side in FIG. 13B shape the energy beams impinging thereon differently for different energy beam shaping purposes. Alternatively, the set of eight individual three dimensional concave secondary reflectors 160 can include eight identical individual three dimensional concave secondary reflectors 161.

Figure 14A:
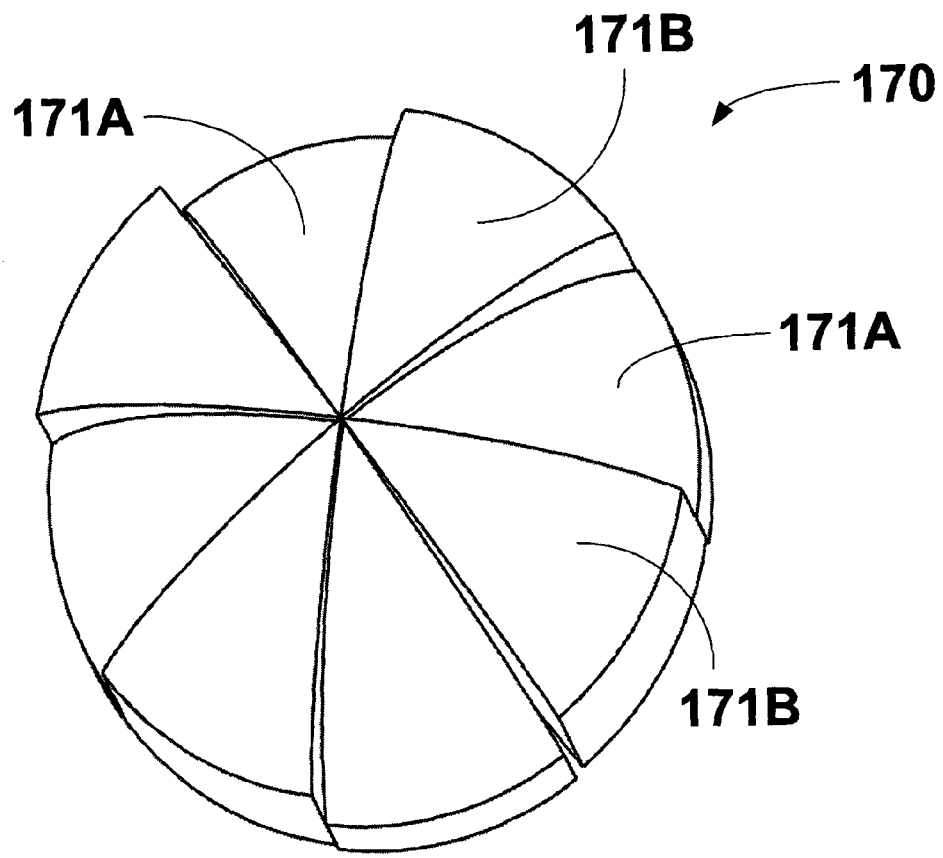
FIG. 14A is an isometric view showing a set of eight individual optical lens segments for use in FIG. 10's energy emitter including four Type I optical lens segments and four Type II optical lens segments.
Figure 14B:
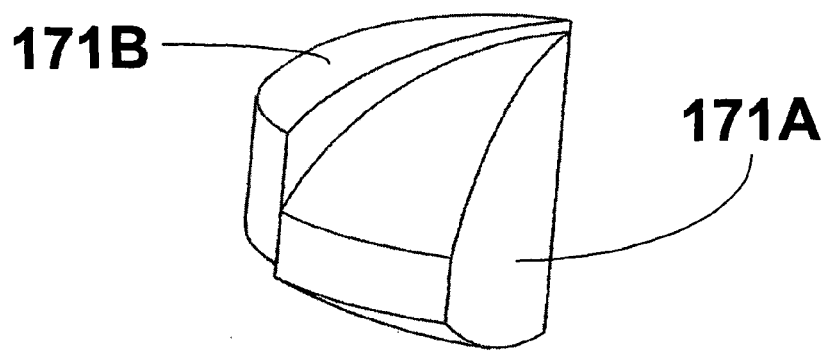
FIG. 14B is an isometric view showing the two different types of optical lens segments side by side.

FIG. 14A shows a set of eight individual optical lens segments 170 including four Type I optical lens segments 171A and four Type II optical lens segments 171B for replacing the single continuous optical lens 151. The two different types of optical lens segments 171A and 171B shown side by side in FIG. 14B shape the energy beams impinging thereon differently for different energy beam shaping purposes. Alternatively, set of eight individual optical lens segments 170 can include eight identical individual optical lens segments 171.

Figure 15:
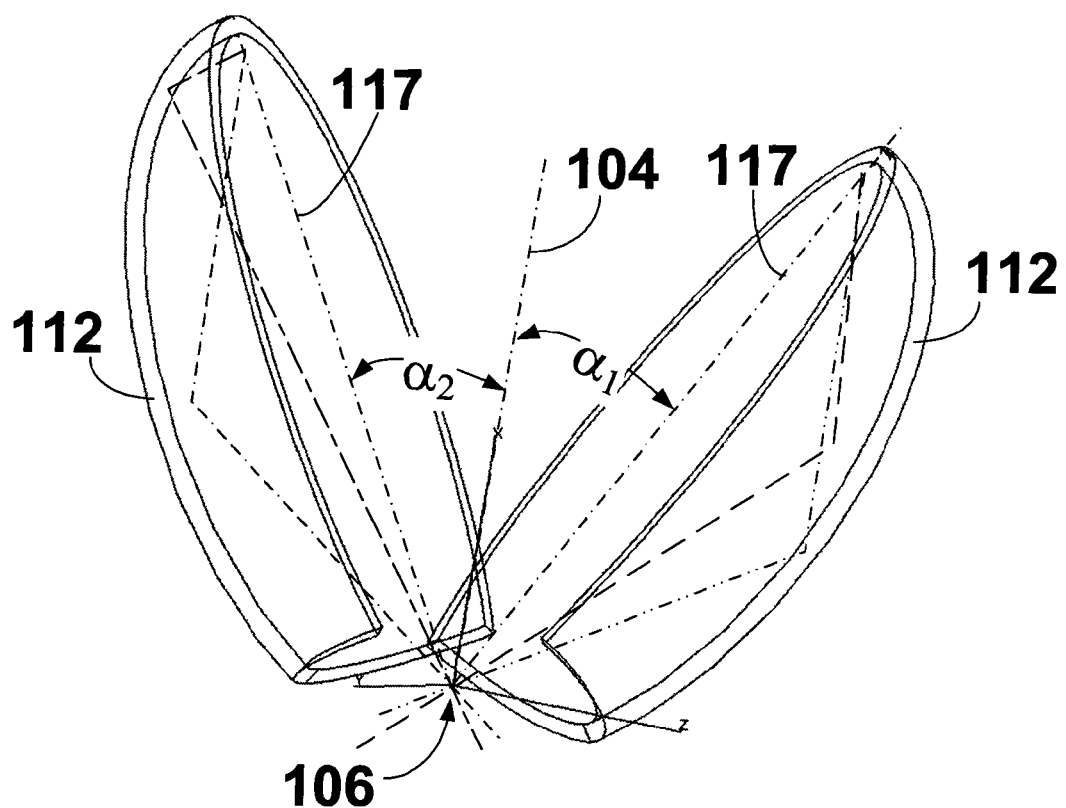
FIG. 15 is an isometric view of FIG. 4's energy emitter showing a pair of primary reflectors subtending an acute primary reflector tilt angle relative to the energy emitter.

FIG. 15 shows a pair of primary reflectors 112 having primary reflector axes of revolutions 117 subtending acute primary reflector tilt angles α1 and α2 relative to the energy emitter axis 104.

Figure 16:
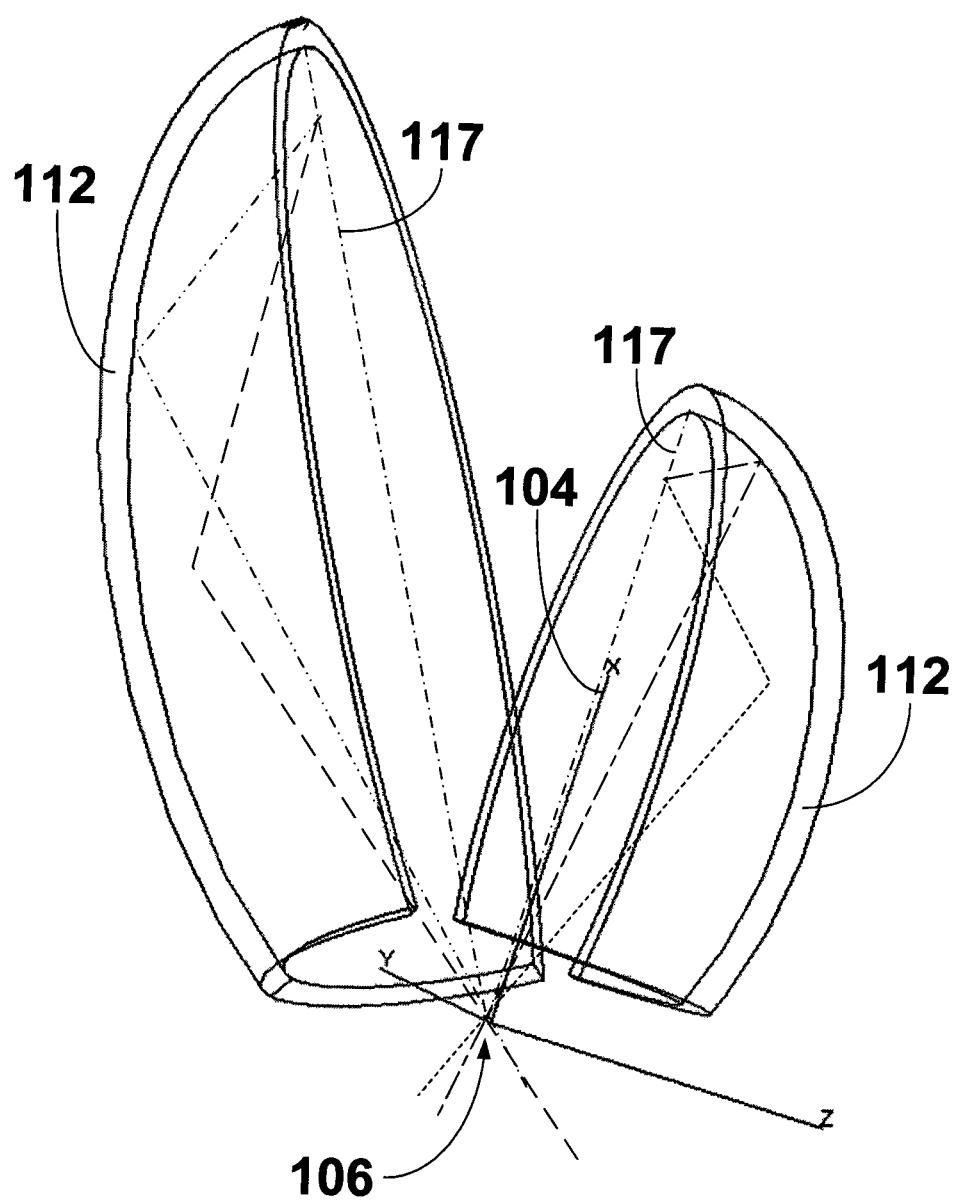
FIG. 16 is an isometric view of FIG. 4's energy emitter showing a pair of different sized and shaped primary reflectors.

FIG. 16 shows a pair of different sized and shaped primary reflectors 112. Different sizes and shapes of primary reflectors 112 can be achieved by assigning different values to either one or both of the semi-major axis and the semi-major axis.

Figure 17A:
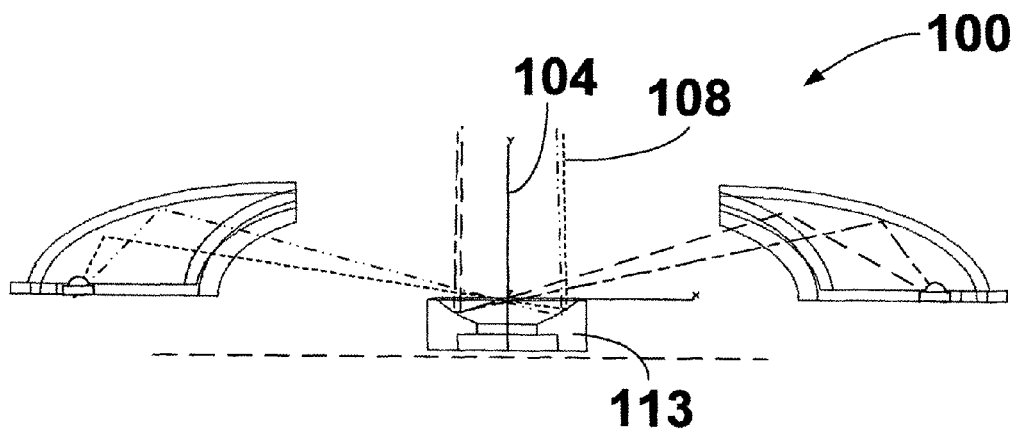
FIGS. 17A and 17B show two cross sections of FIG. 4's energy emitter in an imaginary plane including its energy emitter axis for demonstrating how an inclined single continuous paraboloid secondary reflector inclines an exit beam relative to the energy emitter axis.
Figure 17B:
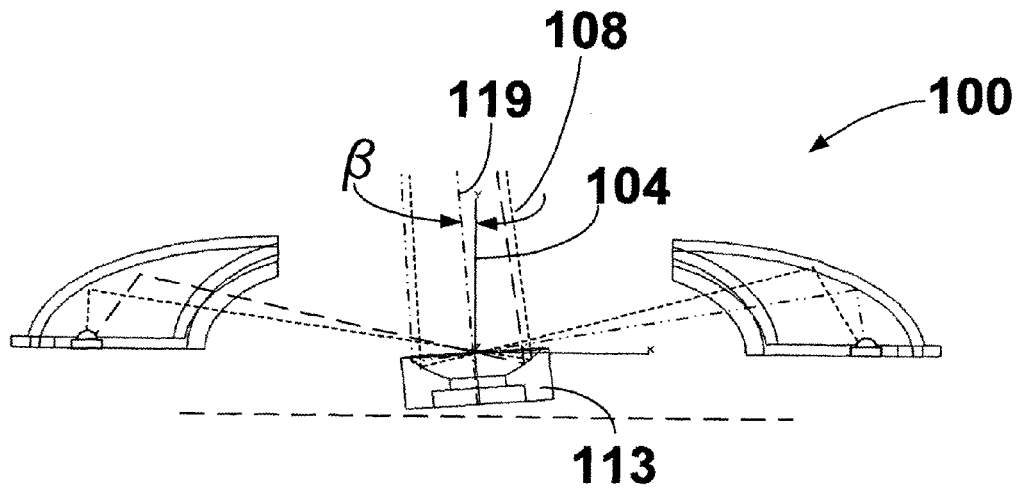

FIGS. 17A and 17B respectively show the energy emitter 100 with the single continuous paraboloid secondary reflector 113 coaxial with energy emitter axis 104 and inclined with respect thereto at a secondary reflector tilt angle β subtended by secondary reflector axis of revolution 119. FIG. 17B shows the tilted secondary reflector 113 correspondingly inclines the exit beam 108 relative to the energy emitter axis 104.

Figure 18:
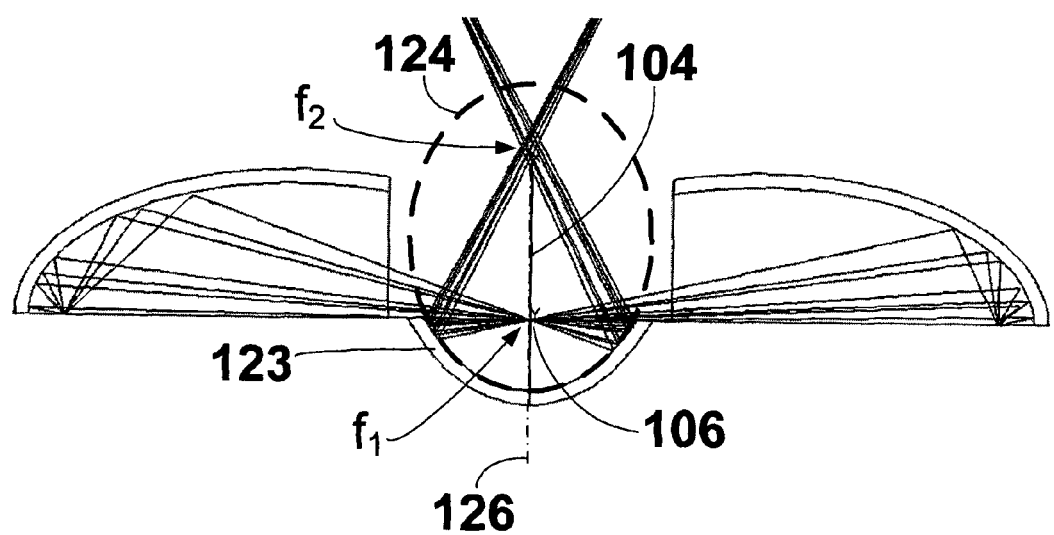
FIG. 18 is a cross section of FIG. 4's energy emitter with a single continuous ellipsoid end secondary reflector.

FIG. 18 shows the energy emitter 100 with a single continuous ellipsoid end secondary reflector 123 instead of the paraboloid secondary reflector 113. The single continuous ellipsoid end secondary reflector 123 is an end of an imaginary ellipsoid 124 having an axis of revolution 126 coaxial with the energy emitter axis 104 and having two focal points f1 and f2. The focal point f1 is co-located with the common focus energy source 106.

Figure 19:
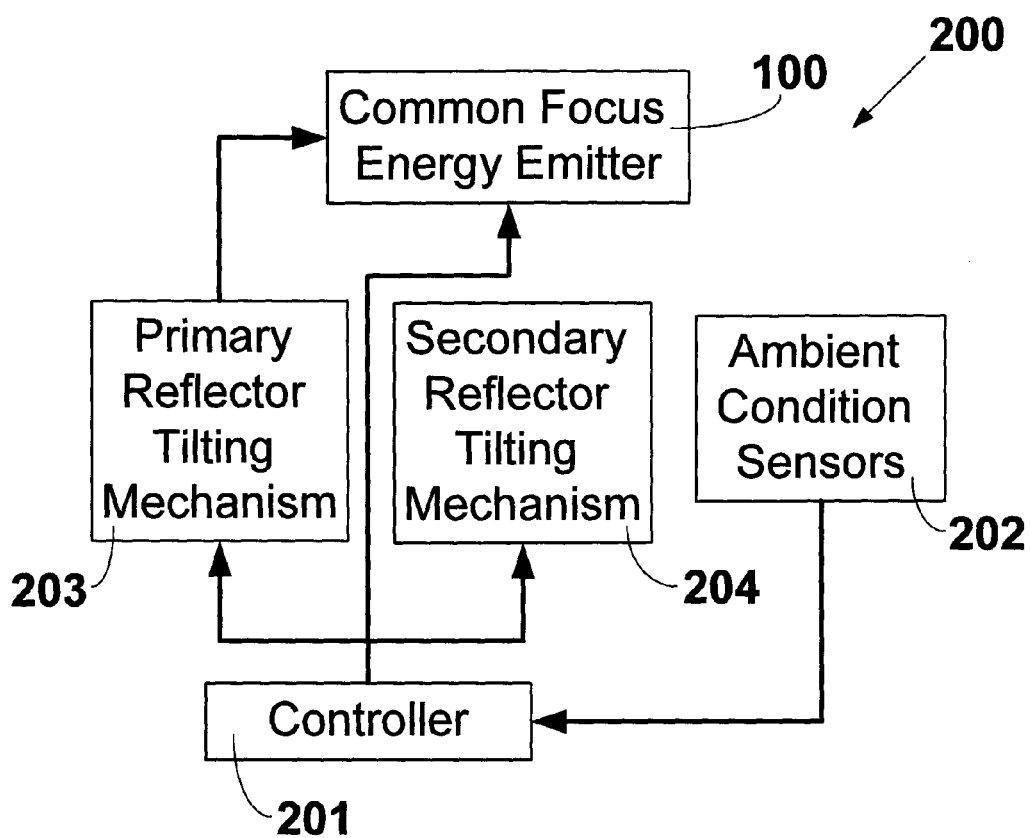
FIG. 19 is a block diagram of an energy emitting device in accordance with another preferred embodiment of the present invention.

FIG. 19 shows an energy emitting device 200 including a controller 201 for controlling the operation of the energy emitter 100 in terms of the operation of the energy sources 111A, . . . , 111H. The controller 201 can be pre-programmed or user programmable. The controllers 201 can receive input information from one or more ambient condition sensors 202 for sensing ambient conditions for controlling their operation. Exemplary ambient conditions to be sensed include inter alia heat, light, pressure, and the like.

The block diagram additionally shows a primary reflector tilting mechanism 203 for selectively tilting one or more primary reflectors 112A, . . . 112H to adjust their individual primary reflector tilt angles α relative to the energy emitter axis 104. The primary reflector tilting mechanism 203 can tilt the primary reflectors 112A, . . . , 112H to the same or different primary reflector tilt angles.

The block diagram additionally shows a secondary reflector tilting mechanism 204 for selectively tilting one or more individual secondary reflectors 161 or the single continuous three dimensional concave secondary reflector 113 as shown in FIG. 17B. The secondary reflector tilting mechanism 204 can tilt the individual secondary reflectors 161 to the same or different secondary reflector tilt angles. Secondary reflector tilting enables steering of exit beam components or an entire exit beam.

Figure 20:
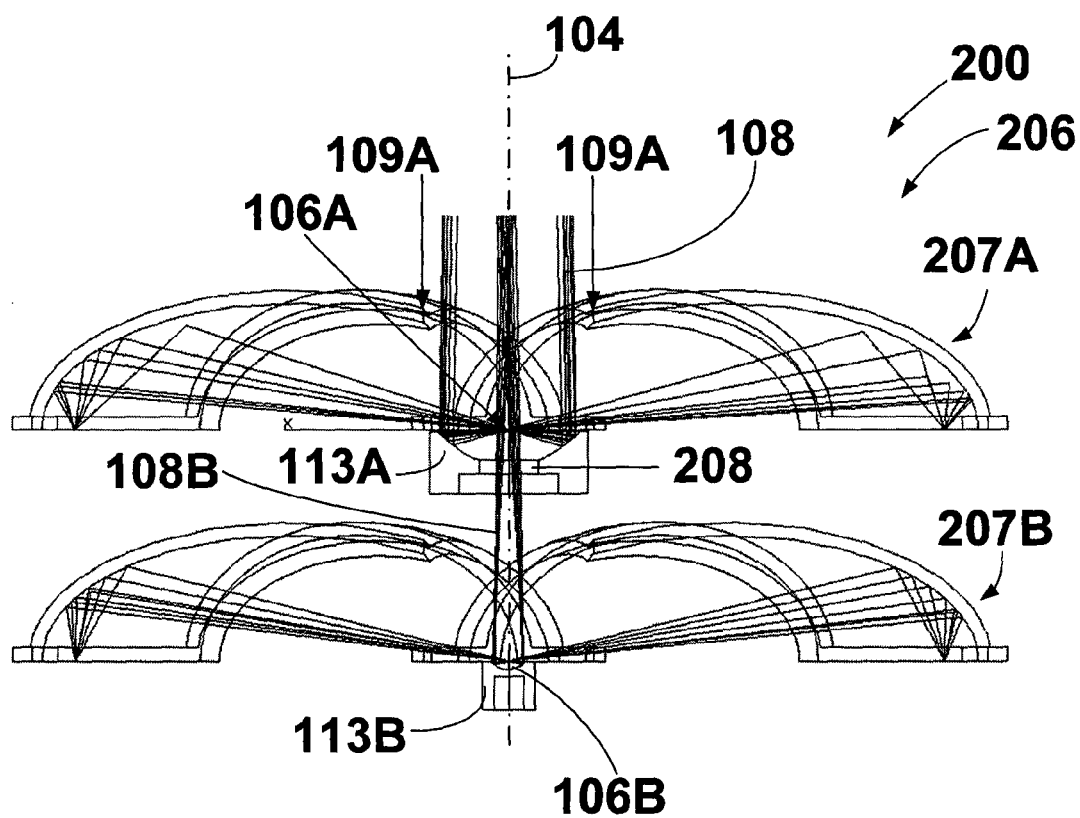
FIG. 20 is a cross section of an energy emitting device including an energy emitter stack in an imaginary plane including its energy emitter axis in accordance with another preferred embodiment of the present invention.

FIG. 20 shows an energy emitting device 200 including an energy emitter stack 206 including a leading energy emitter 207A stacked on a trailing energy emitter 207B. The leading energy emitter 207A and the trailing energy emitter 207B are both similar in construction and operation as the energy emitter 100 and therefore similar parts are likewise numbered and respectively denoted A and B. The paraboloid secondary reflector 113A additionally includes a second aperture 208 coaxial with the energy emitter axis 104 and on the opposite side of the common focus energy source 106A relative to the exit beam aperture 109A. The paraboloid secondary reflector 113B emits an exit beam 108B which passes through the second aperture 208 and combines with the exit beam 108A to exit through the exit beam aperture 109A.

Figure 21:
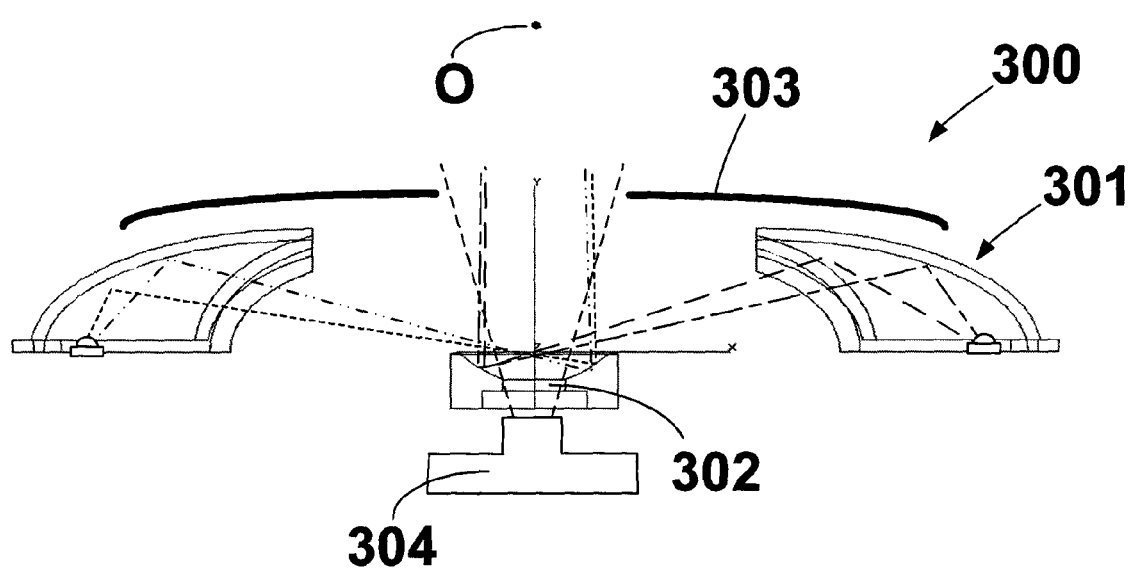
FIG. 21 is a cross section of an image acquisition system including an energy emitter and an image acquisition device in an imaginary plane including its energy emitter axis.

FIG. 21 shows an image acquisition system 300 having an energy emitter 301 including a second aperture 302 similar to the second aperture 208 and an exit beam aperture 303. The image acquisition system 300 includes an image acquisition device 304 for imaging an object through the second aperture 302 and the exit beam aperture 303.

While the invention has been described with respect to a limited number of embodiments, it will be appreciated that many variations, modifications, and other applications of the invention can be made within the scope of the appended claims.

The invention claimed is:

1. A common focus energy emitter for emitting an exit beam, the emitter having an energy emitter axis and comprising:
   (a) a common focus energy source for emitting an exit beam through an exit beam aperture, said common focus energy source and said exit beam aperture defining the energy emitter axis; and
   (b) at least two spaced apart energy source units each having:
   i) an energy source for emitting energy,
   ii) a three dimensional concave primary reflector for reflecting energy emitted by its associated energy source into an energy beam focused at said common focus energy source,
      said primary reflector bounding a minor three dimensional concave section of an imaginary primary reflector ellipsoid of revolution having a primary reflector axis of revolution non-coaxial with the energy emitter axis,
      said imaginary primary reflector ellipsoid of revolution having a semi-major axis and a semi-minor axis in an imaginary plane including the energy emitter axis,
      said primary reflector axis of revolution including a pair of spaced apart focal points,
      said pair of spaced apart focal points including a first focal point located at said common focus energy source and a second focal point at which its associated energy source is disposed thereat,
      said primary reflector axis of revolution subtending a primary reflector tilt angle relative to said imaginary plane including the energy emitter axis, and
   iii) a secondary optical element for shaping said energy beam from its associated primary reflector traversing said common focus energy source into an exit beam component of the exit beam.

2. The emitter according to claim 1 wherein a first said imaginary primary reflector ellipsoid of revolution and a second said imaginary primary reflector ellipsoid of revolution have a different cross section in said imaginary plane.

3. The emitter according to claim 1 and further comprising a primary reflector tilting mechanism for selectively tilting a said primary reflector to modify its said primary reflector tilt angle relative to the energy emitter axis in said imaginary plane.

4. The emitter according to claim 1 wherein each said secondary optical element is constituted by an individual three dimensional concave secondary reflector bounding a minor three dimensional concave section of an imaginary secondary reflector body of revolution having a secondary reflector axis of revolution including a focal point located at said common focus energy source and subtending a secondary reflector tilt angle relative to the energy emitter axis in said imaginary plane, and
   said exit beam aperture is opposite each said individual three dimensional concave secondary reflector such that each said individual three dimensional concave secondary reflector reflects said energy beam from its associated primary reflector.

5. The emitter according to claim 4 and further comprising a secondary reflector tilting mechanism for selectively tilting a said secondary reflector to modify its said secondary reflector tilt angle relative to the energy emitter axis in said imaginary plane.

6. The emitter according to claim 1 wherein each said secondary optical element is constituted by a single continuous three dimensional concave secondary reflector bounding an imaginary secondary reflector body of revolution having a secondary reflector axis of revolution, said single continuous three dimensional concave secondary reflector having a focal point at said common focus energy source, said secondary reflector axis of revolution subtending a secondary reflector tilt angle relative to the energy emitter axis in said imaginary plane, and said exit beam aperture is opposite said single continuous three dimensional concave secondary reflector such that said single continuous three dimensional concave secondary reflector reflects said energy beams from said at least two primary reflectors through said exit beam aperture.

7. The emitter according to claim 6 and further comprising a secondary reflector tilting mechanism for selectively tilting said single continuous three dimensional concave secondary reflector to modify its said secondary reflector tilt angle relative to the energy emitter axis in said imaginary plane.

8. The emitter according to claim 6 wherein said single continuous three dimensional concave secondary reflector is constituted by a paraboloid secondary reflector having a focal point at said common focus energy source.

9. The emitter according to claim 6 wherein said single continuous three dimensional concave secondary reflector is constituted by an ellipsoid end secondary reflector having an axis of revolution including a pair of spaced apart focal points including a first focal point located at said common focus energy source.

10. The emitter according to claim 6 wherein said at least two secondary reflectors bound a second aperture coaxial with the energy emitter axis and on the opposite side of said common focus energy source relative to said exit beam aperture.

11. The emitter according to claim 1 wherein each said secondary optical element is constituted by an individual optical lens segment.

12. The emitter according to claim 1 wherein each said secondary optical element is constituted by a single continuous optical lens having an optical lens axis of revolution coaxial with the energy emitter axis.

13. A common focus energy emitting device comprising an energy emitter according to claim 1 and a controller for controlling operation of said energy emitter.

14. The device according to claim 13 wherein said controller controls the operation of said energy emitter according to at least one ambient condition.

15. The device according to claim 14 wherein said controller controls the operation of said energy emitter according to at least one ambient energy condition.

16. A common focus energy emitting device comprising:
(a) a leading energy emitter according to claim 1 for emitting a first exit beam and additionally formed with a second aperture coaxial with the energy emitter axis and on the opposite side of said common focus energy source relative to said exit beam aperture; and
(b) a trailing energy emitter according to claim 1 for emitting a second exit beam wherein said trailing energy emitter includes a secondary reflector paraboloid stacked behind said leading energy emitter such that said second exit beam passes through said second aperture to combine with said first exit beam for simultaneously passing through said exit beam aperture.

17. An image acquisition system for imaging of an object, the image acquisition system comprising:
(a) an energy emitter according to claim 1 and additionally formed with a second aperture coaxial with the energy emitter axis and on the opposite side of said common focus energy source relative to said exit beam aperture; and
(b) an image acquisition device for imaging the object through said second aperture and said exit beam aperture.

18. The emitter according to claim 4 wherein said at least two secondary reflectors bound a second aperture coaxial with the energy emitter axis and on the opposite side of said common focus energy source relative to said exit beam aperture.

* * * * *